(12) United States Patent
Hill et al.

(10) Patent No.: US 7,671,277 B2
(45) Date of Patent: Mar. 2, 2010

(54) FITTING DIVIDER WALL FOR A MULTI-CHANNEL METAL RACEWAY

(75) Inventors: Raymond M. Hill, Plainfield, IL (US); Robert T. Fitzpatrick, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 12/166,643

(22) Filed: Jul. 2, 2008

(65) Prior Publication Data

US 2010/0000782 A1 Jan. 7, 2010

(51) Int. Cl.
*H02G 3/08* (2006.01)

(52) U.S. Cl. ............ 174/72 A; 174/480; 174/481; 174/72 C; 174/95; 174/101; 52/220.1; 439/207; 385/135

(58) Field of Classification Search ........... 174/480, 174/481, 72 A, 72 C, 68.1, 68.3, 95, 97, 99 R, 174/101, 72 R, 135, 98; 439/207, 209, 210–213, 439/502; 52/220.1, 220.3, 220.7, 239, 220.8; 385/134, 135
See application file for complete search history.

(56) References Cited

U.S. PATENT DOCUMENTS

| | | | | |
|---|---|---|---|---|
| 4,017,137 A | * | 4/1977 | Parks | ................. 439/135 |
| 4,255,610 A | * | 3/1981 | Textoris | ................. 174/495 |
| 4,479,687 A | * | 10/1984 | Humphreys et al. | ......... 439/209 |
| 4,688,869 A | * | 8/1987 | Kelly | ................. 439/209 |
| 4,874,322 A | * | 10/1989 | Dola et al. | ................. 439/210 |
| 5,995,699 A | | 11/1999 | Vargas et al. | |
| 6,002,089 A | | 12/1999 | Hemingway et al. | |
| 6,344,611 B2 | | 2/2002 | Ewer et al. | |
| 6,380,486 B1 | | 4/2002 | Hemingway et al. | |
| 6,384,336 B1 | * | 5/2002 | VanderVelde et al. | ......... 174/95 |
| 6,909,044 B2 | | 6/2005 | Ewer et al. | |
| 6,936,766 B1 | | 8/2005 | Galasso | |
| 6,938,337 B2 | | 9/2005 | Ewer et al. | |
| 7,045,707 B1 | | 5/2006 | Galasso | |
| 7,223,925 B2 | | 5/2007 | Ewer et al. | |

* cited by examiner

*Primary Examiner*—Dhiru R Patel
(74) *Attorney, Agent, or Firm*—Robert A. McCann; Christopher S. Clancy; Aimee E. McVady (57) ABSTRACT

The present invention is directed towards a multi-channel raceway system with a raceway and a fitting component. The raceway includes a base with a bottom and sidewalls that define a channel and a divider wall positioned within the channel. The fitting component includes a base with a bottom and sidewalls that define a channel and a plurality of sets of raised projections. The fitting component also includes a fitting divider wall positioned within the channel of the fitting component. The fitting divider wall includes at least one positioning tab along the bottom of the fitting divider wall for engaging the raised projections extending from the fitting base to secure the fitting divider wall to the fitting base.

6 Claims, 9 Drawing Sheets

FIG. 17

FITTING DIVIDER WALL FOR A MULTI-CHANNEL METAL RACEWAY

FIELD OF THE INVENTION

The present invention relates to a multi-channel metal raceway, and more particularly to a fitting divider wall for a multi-channel metal raceway.

BACKGROUND OF THE INVENTION

Metal raceways are used to route power wiring or communication cable along surfaces such as walls, floors, ceilings or on other fixed structures. Raceways provide a convenient way to manage electrical wiring for multiple circuits and/or communication cables while keeping them out of sight and eliminate the physical and network dangers associated with exposure. The metal raceways thus provide an aesthetic and easy way to route wiring or cables from a power source or network entrance to a desired location.

The power and communication cables must be routed in separate channels in the raceway. As a result, a divider wall divides the raceway to form and maintain multiple channels to accommodate the power and communication cables. Often the amount or size of the cables requires the capacity of one of the channels to be larger than another. Additionally, a fitting divider all is required to support raceway divider walls and to maintain the division of the raceway into multiple channels through the entire raceway system.

Therefore, there is a need for a fitting divider wall that is easily installed in a raceway fitting to support a raceway divider wall in a plurality of locations.

SUMMARY OF THE INVENTION

The present invention is directed towards a multi-channel raceway system including a raceway and a fitting component. The raceway includes a base with a bottom and sidewalls that define a channel. The base also includes a divider wall positioned within the channel. The fitting component is connected to the raceway base. The fitting component includes a base with a bottom and sidewalls that define a channel and a fitting divider wall positioned within the channel. The fitting base has a plurality of sets of raised projections. The fitting divider wall includes at least one positioning tab along the bottom of the fitting divider wall. The positioning tab of the fitting divider wall is installed in one of the raised projections extending from the fitting base to secure the fitting divider wall to the fitting base.

DETAILED DESCRIPTION

Figure 1:
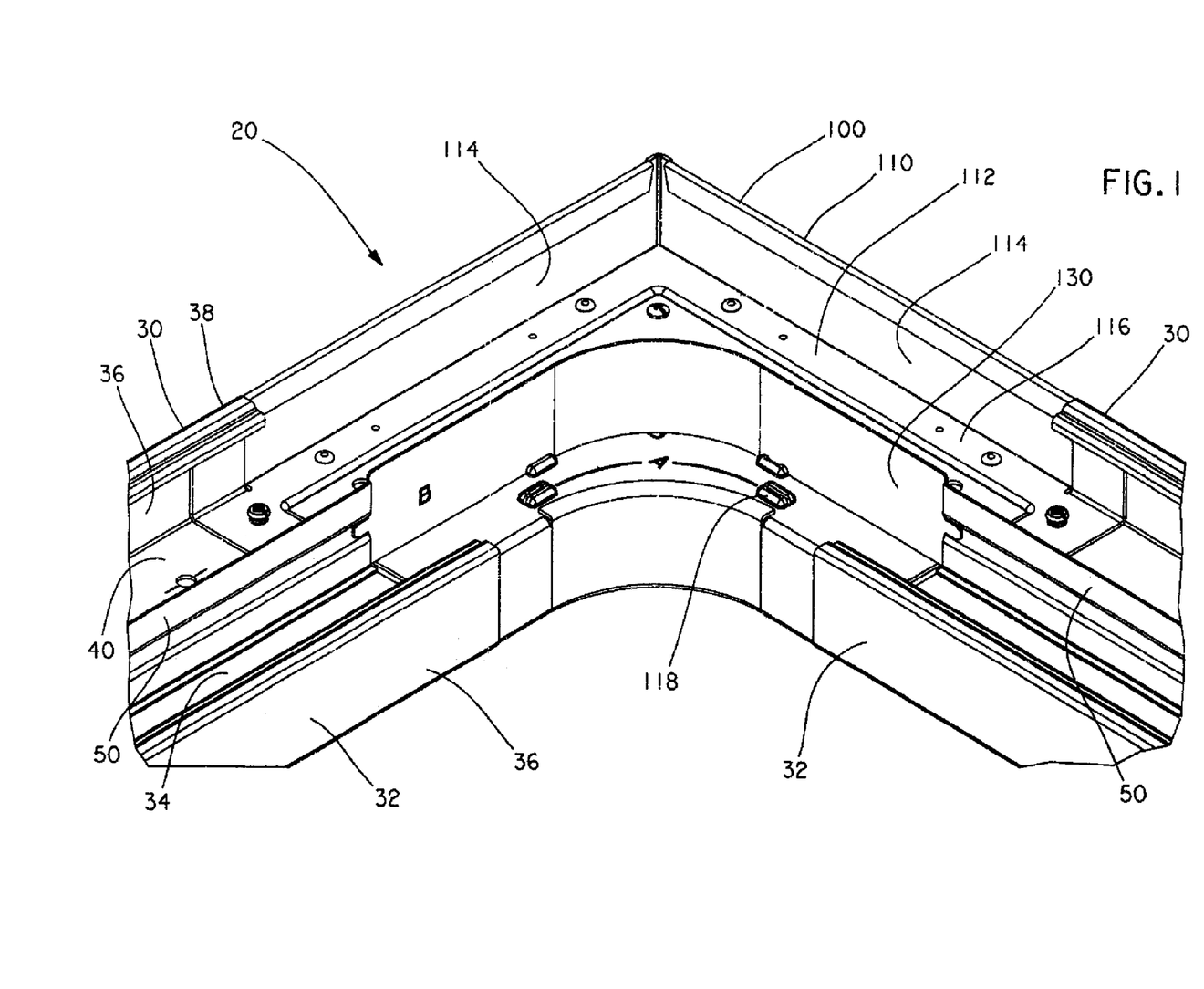
FIG. 1 is a front perspective view of two raceway bases connected to a right angle fitting with a fitting divider wall of the present invention.
Figure 2:
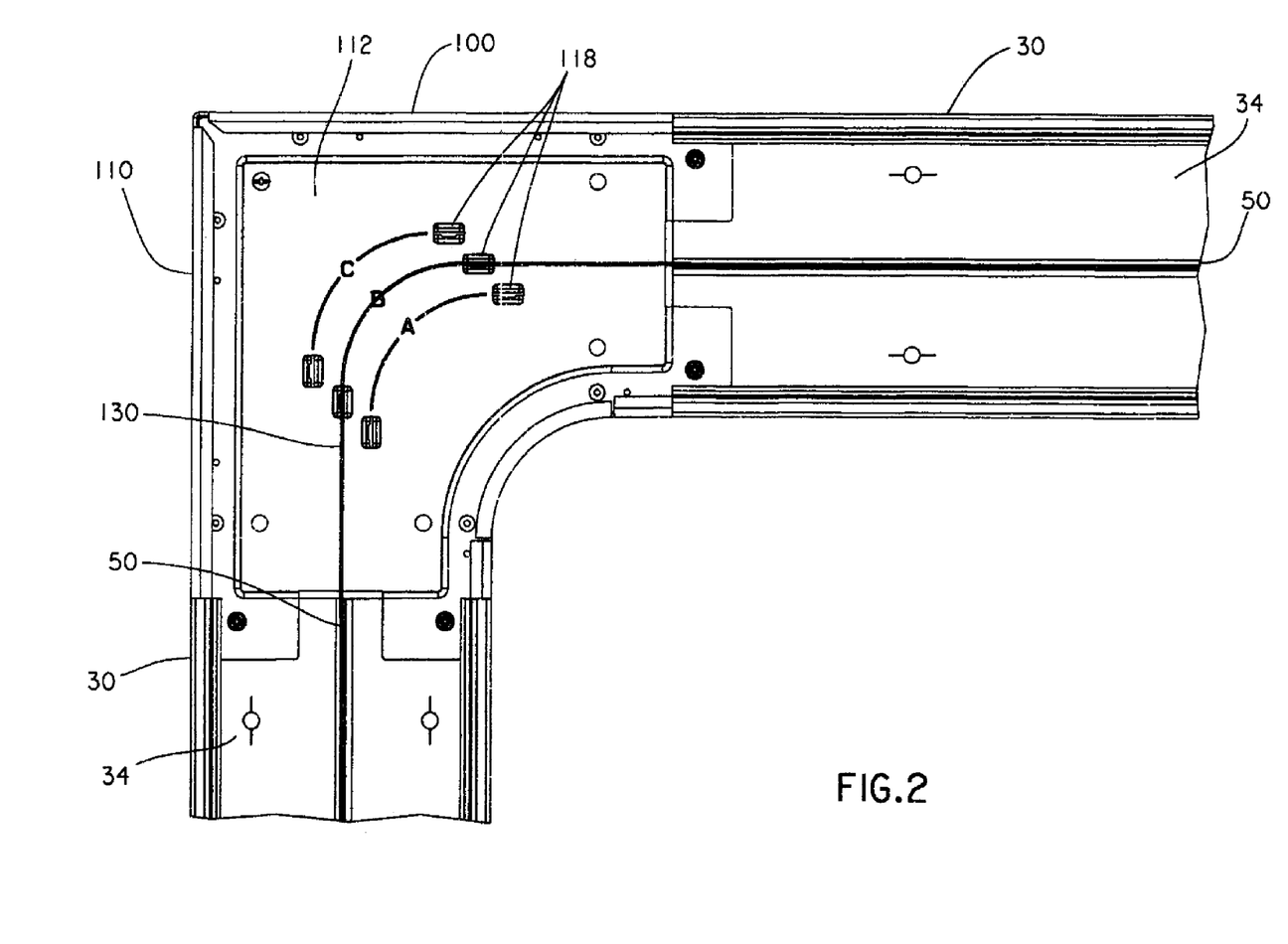
FIG. 2 is a top view of the raceway bases and the right angle fitting of FIG. 1 with the divider walls providing a 50/50 channel split.
Figure 3:
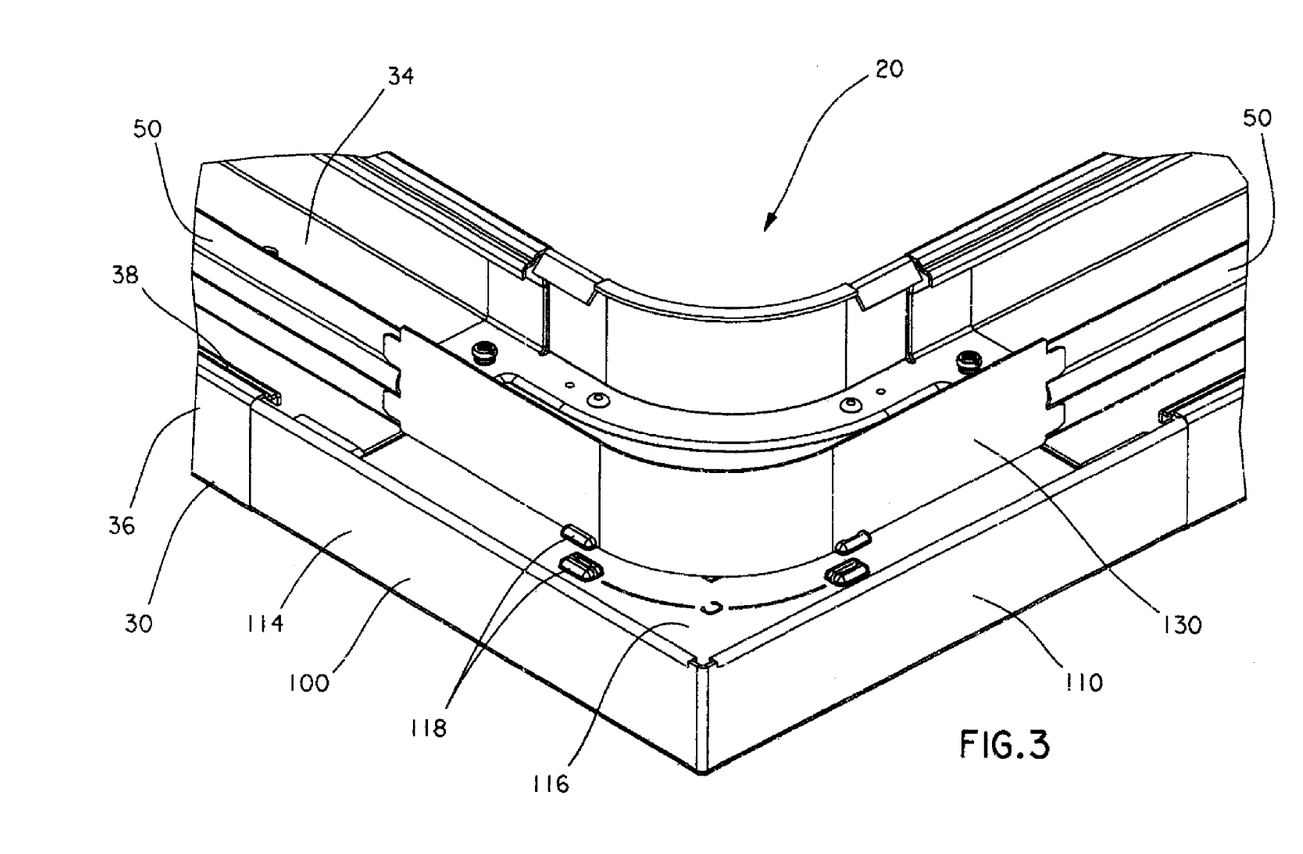
FIG. 3 is a rear perspective view of the raceway bases and the right angle fitting of FIG. 1.

FIGS. 1-3 illustrate a multi-channel metal raceway system 20 with a right angle fitting 100 including a fitting divider wall 130 of the present invention. The multi-channel metal raceway 30 is illustrated and described in commonly owned U.S. Patent Application No. 2007/0044987 A1, the contents of which are herein incorporated by reference.

The multi-channel raceway 30 includes a base 32 with a bottom wall 34 and sidewalls 36. Each sidewall 36 includes a flange 38. The multi-channel metal raceway 30 also includes a cover (not illustrated) with flanges that matingly engage the flanges 38 of the raceway base 32. When the cover is installed over the base 32, a channel 40 is formed therein for routing cables in the raceway 30.

As shown and described in commonly owned pending U.S. patent application Ser. No. 12/137,028 the contents of which are herein incorporated by reference, a divider wall 50 may be positioned in a plurality of locations in the multi-channel raceway 30. The divider wall 50 may divide the multi-channel raceway into a 40/60, 50/50 or a 60/40 split to accommodate the required power and communication division.

FIGS. 1-3 illustrate the multi-channel raceway 30 with a divider wall 50 and a right angle fitting 100. Although a right angle fitting is illustrated and described, other fitting components may also be designed to receive the fitting divider wall of the present invention. The right angle fitting 100 has a base 110 with a bottom wall 112 and sidewalls 114 that define a channel 116. The right angle fitting 100 receives a cover (not illustrated) installed over the base 110. The right angle fitting 100 includes a fitting divider wall 130 that interconnects with the raceway divider wall 50. The raceway divider wall 50 and the fitting divider wall 130 illustrated in FIGS. 1-3 are positioned to divide the raceway into a 50/50 channel split. The raceway divider wall 50 and the fitting divider wall 130 may also be positioned in the raceway system to divide the raceway 30 and fitting 100 into a 40/60 or a 60/40 channel split (see FIGS. 16 and 17).

Figure 4:
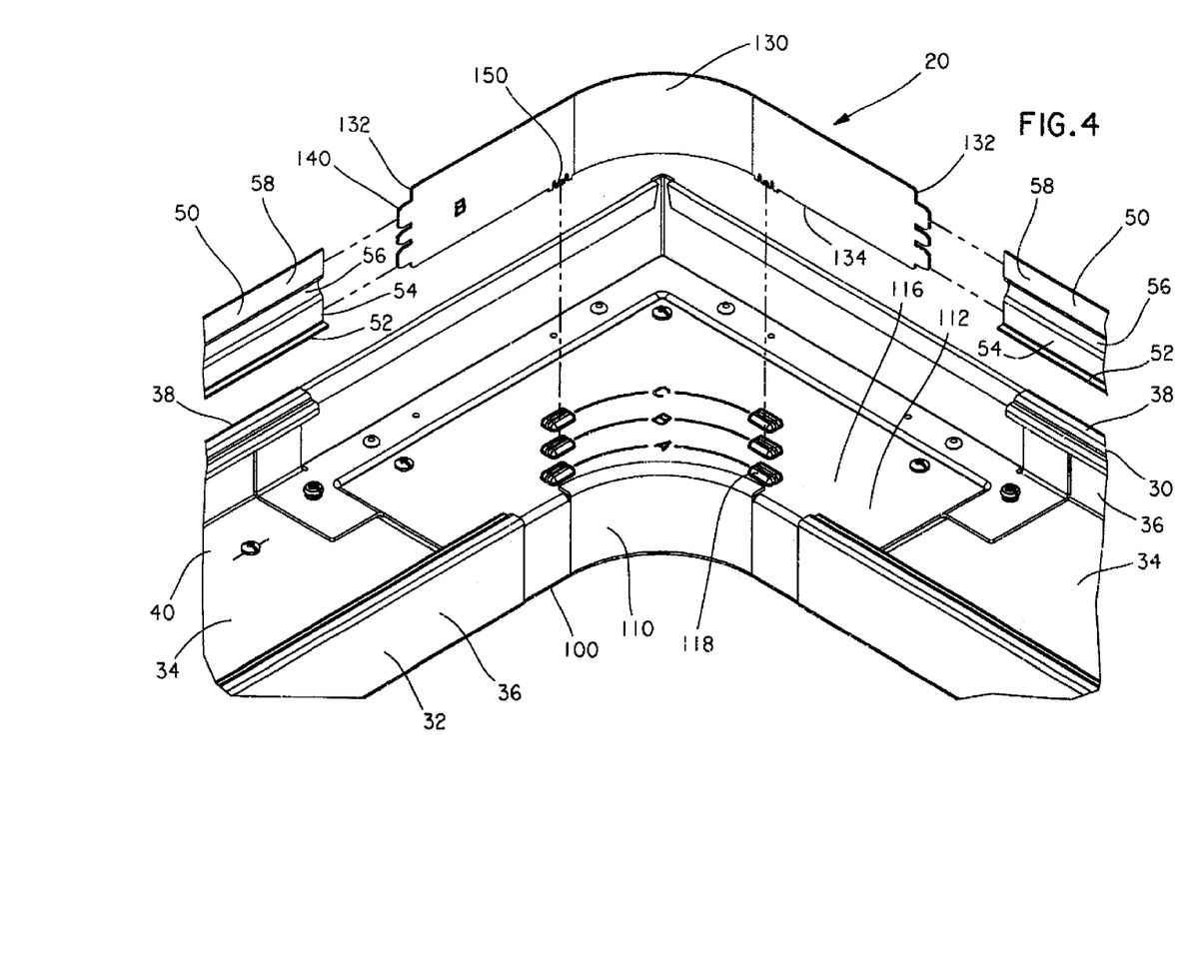
FIG. 4 is an exploded view of the divider walls to be installed in the raceway bases and the right angle fitting of FIG. 1.

As illustrated in FIG. 4, the raceway divider wall 50 includes a foot portion 52, a first straight portion 54, a curved portion 56 and a second straight portion 58. The fitting divider wall 130 includes interlocking tabs 140 at each end 132. The fitting divider wall 130 also includes positioning tabs 150 located along the bottom 134 of the fitting divider wall 130.

The base 110 of the right angle fitting 100 includes a plurality of sets of rectangular raised projections 118. Each raised projection 118 is punch formed with a slot 120 and a relief area 122. As illustrated in FIG. 4, the positioning tabs 150 of the fitting divider wall 130 align with one of the sets of the rectangular raised projections 118 before the fitting divider wall 130 is installed in the right angle fitting 100.

Figure 5:
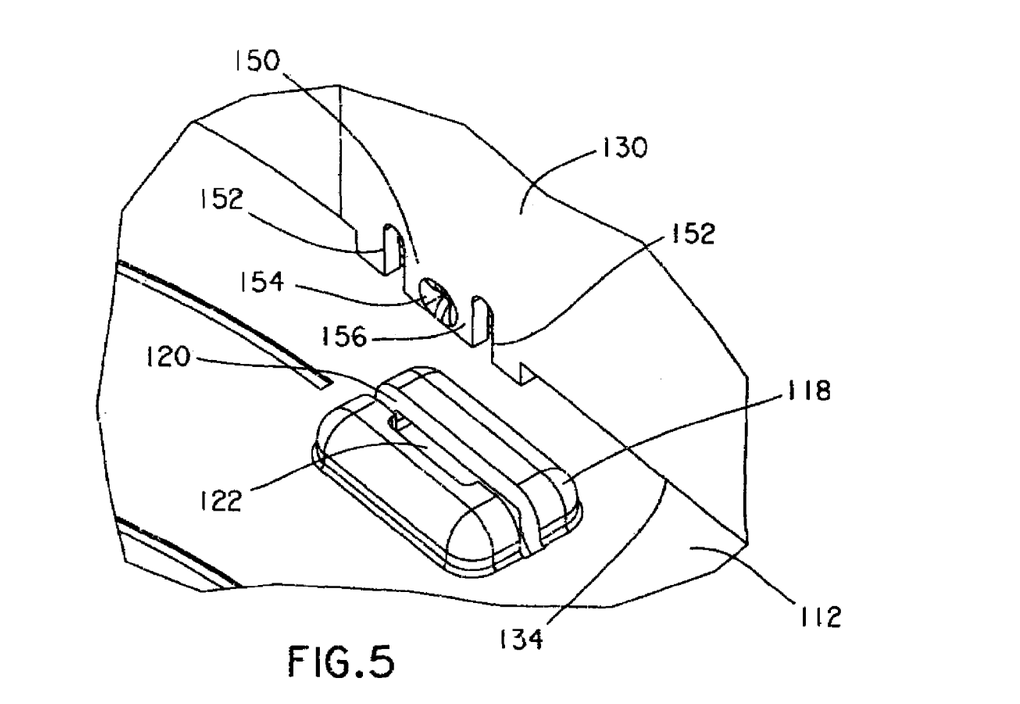
FIG. 5 is a front perspective view of the positioning tab of the fitting divider wall and the raised projection of the right side of the fitting base of FIG. 1 prior to installation.
Figure 6:
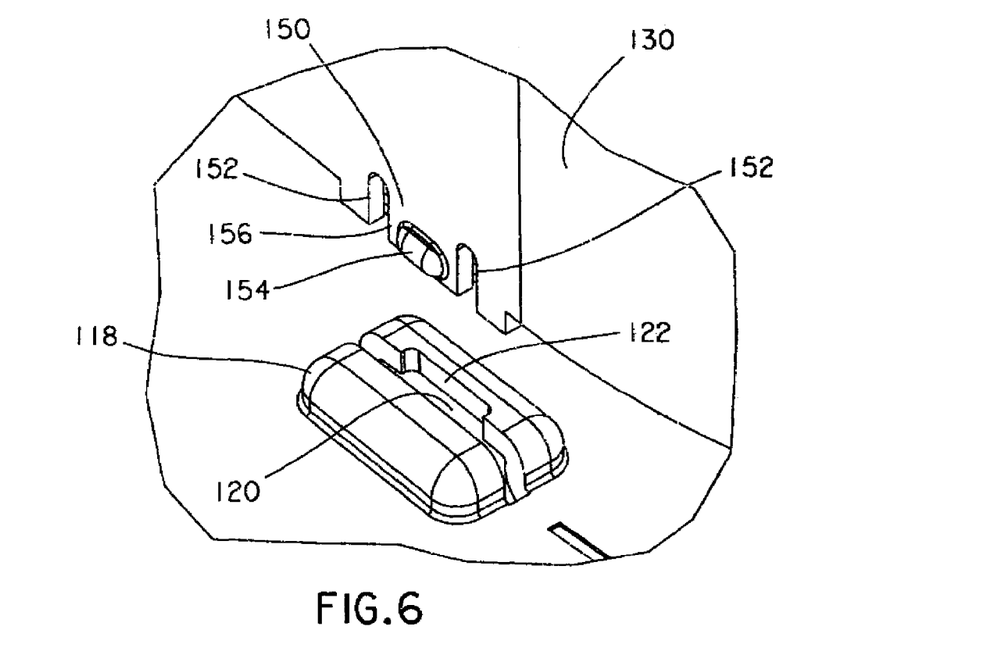
FIG. 6 is a rear perspective view of the positioning tab of the fitting divider wall and the raised projection of the right side of the fitting base of FIG. 1 prior to installation.
Figure 7:
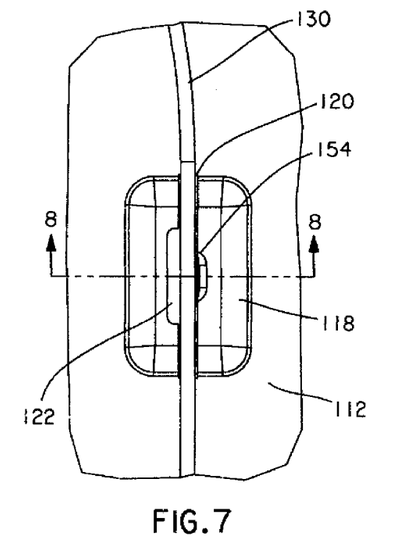
FIG. 7 is a top view of the positioning tab of the fitting divider wall and the raised projection of the fitting base of FIG. 5.
Figure 8:
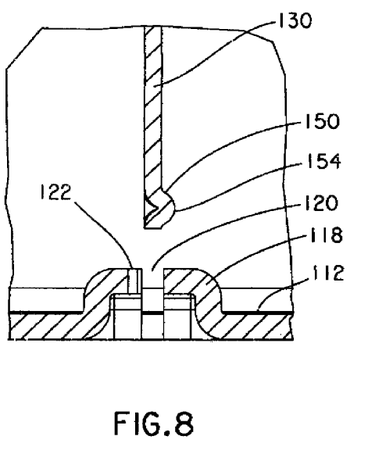
FIG. 8 is a cross sectional view of the positioning tab of the fitting divider wall and the raised projection of the fitting base taken along line 8-8 of FIG. 7.
Figure 9:
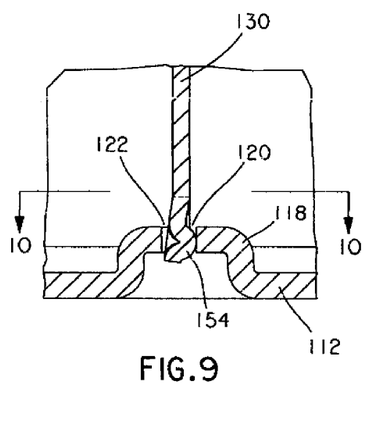
FIG. 9 is a cross sectional view of the positioning tab of the fitting divider wall being installed in the raised projection of the fitting base.
Figure 10:
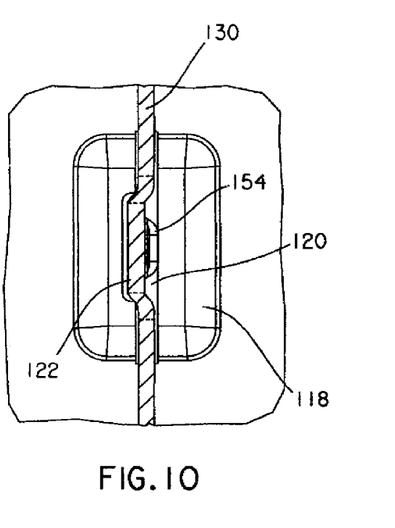
FIG. 10 is a cross sectional view of the positioning tab of the fitting divider wall being installed in the raised projection of the fitting base taken along line 10-10 of FIG. 9.
Figure 11:
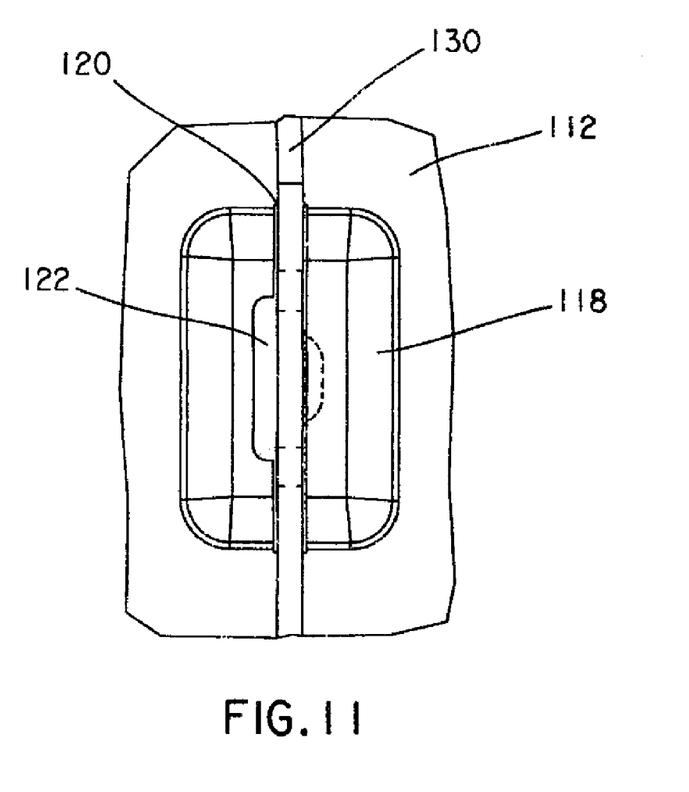
FIG. 11 is a top view of the positioning tab of the fitting divider wall installed in the raised projection of the fitting base.
Figure 12:
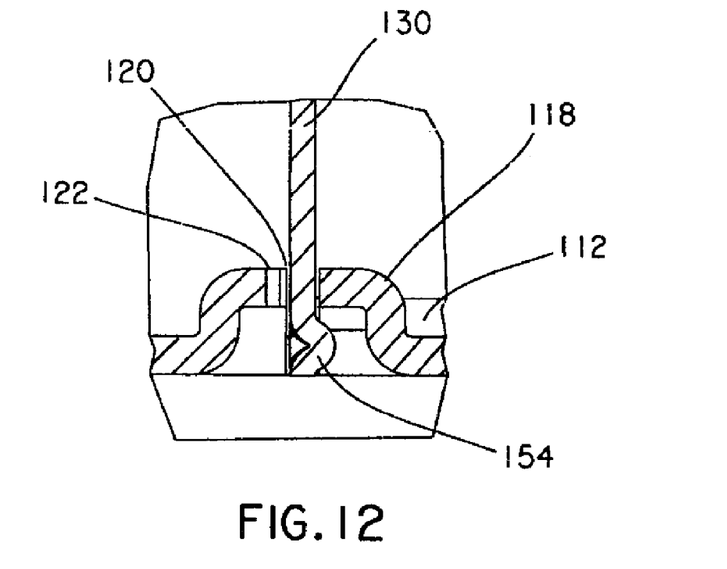
FIG. 12 is a cross sectional view of the positioning tab of the fitting divider wall installed in the raised projection of the fitting base of FIG. 11.

FIGS. 5-12 illustrate the positioning tabs 150 of the fitting divider wall 130 being installed in the raised projections 118 of the fitting base 110. As shown in FIGS. 5 and 6, the positioning tabs 150 in the fitting divider wall 130 include two relief slots 152 and in outwardly extending bead 154. Each bead 154 snap-fits into one of the raised projections 118 of the fitting base 110. As the fitting divider wall 130 is pressed downward (see FIGS. 9 and 10), each bead 154 enters the slot 120 in the raised projection 118. The bead 154 engages the raised projection 118 thereby forcing the section 156 between the relief slots 152 of the positioning tab 150 to deflect backwards towards the relief area 122 in the raised projection 118. The deflection of the positioning tab 150 provides enough clearance for the bead 154 to snap into the raised projection 118. As illustrated in FIGS. 11 and 12, once installed, the fitting divider wall 130 is secured to the fitting base 110 until a sufficient force is applied to enable the bead 154 to snap out of the raised projection 118.

Figure 13:
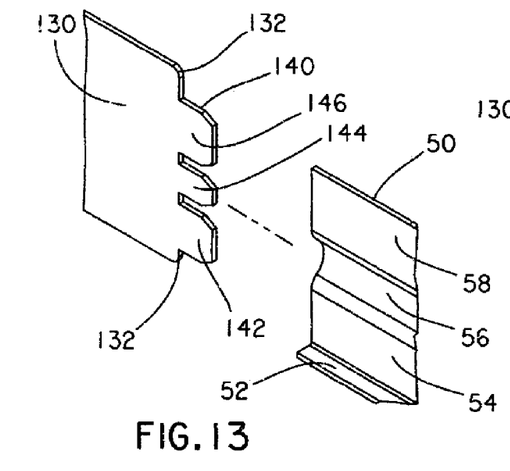
FIG. 13 is an exploded partial perspective view of the interlocking tabs of the fitting divider wall and the raceway divider wall.
Figure 14:
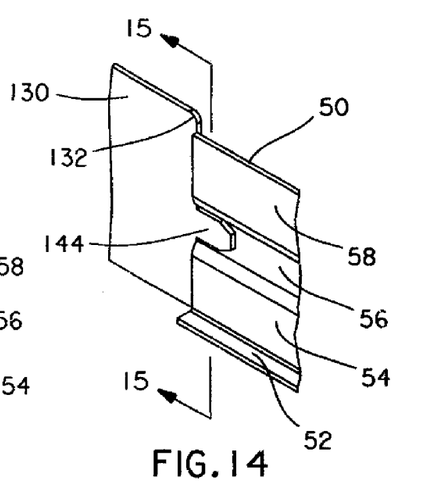
FIG. 14 is a partial perspective view of the fitting divider wall secured to the raceway divider wall of FIG. 13.
Figure 15:
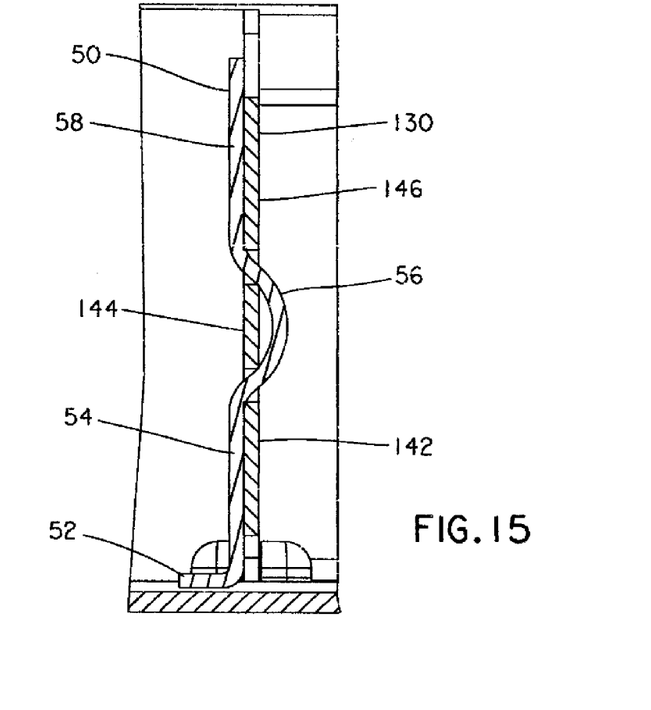
FIG. 15 is a cross sectional view of the fitting divider wall connected to the raceway divider wall taken along line 15-15 of FIG. 14.

FIGS. 13-15 illustrate the fitting divider wall 130 and the raceway divider wall 50. As discussed above, the fitting divider wall 130 includes interlocking tabs 140 at each end. The interlocking tabs 140 of the fitting divider wall 130 matingly engage the raceway divider wall 50. The interlocking tabs 140 include three fingers with the first finger 142 and the third finger 146 being larger than the second finger 144. As shown in FIGS. 14 and 15, the second finger 144 of the interlocking tabs 140 is positioned within the curved portion 56 of the raceway divider wall 50. The first and the third fingers 142, 146 of the interlocking tabs 140 are positioned on a side of the divider wall 50 opposite of the second finger 144. The first and third fingers 142, 146 are positioned adjacent to the first and second straight portions 54, 58, respectively, of the raceway divider wall 50. The interlocking tabs 140 provide stability to the divider walls 50 and 130 in the multi-channel raceway system. As a result, it is easier for installers to pull wires and cables through the installed multi-channel raceway system.

Figure 16:
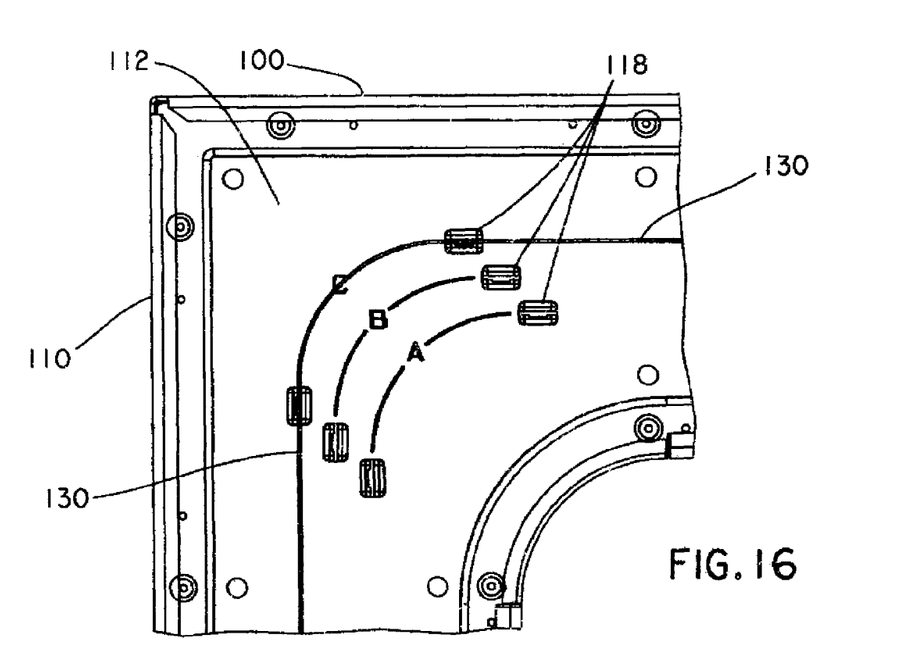
FIG. 16 is a top view of the raceway bases and the right angle fitting of FIG. 1 with the divider walls providing a 40/60 channel split.
Figure 17:
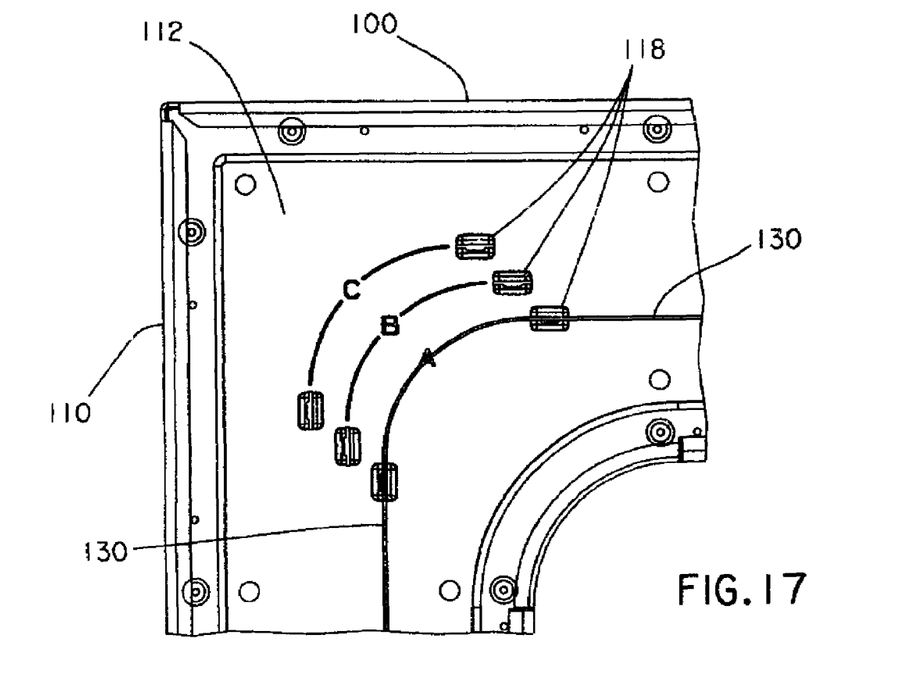
FIG. 17 is a top view of the raceway bases and the right angle fitting of FIG. 1 with the divider walls providing a 60/40 channel split.

As discussed above, the fitting base 110 includes a plurality of sets of raised projections 118. Each set of raised projections 118 is positioned to enable the installed fitting divider wall 130 to divide the channel 116 into a 40/60 channel split, a 50/50 channel split or a 60/40 channel split to accommodate the required power and communication division in the raceway system. Additionally, the fitting divider wall 130 supports the raceway divider wall 50 in a plurality of locations. FIG. 16 illustrates the fitting divider wall 130 installed in the fitting base 110 to provide a 40/60 channel split. FIGS. 1-3 illustrate the fitting divider wall 130 installed in the fitting base 110 to provide a 50/50 channel split. FIG. 17 illustrates the fitting divider wall 130 installed in the fitting base 110 to provide a 60/40 channel split.

As discussed above, although the multi-channel raceway system 20 is illustrated with a right angle fitting 100, the fitting divider wall 130 may be used with additional fitting components. The fitting divider wall may also be used with an entrance end fitting, an inside 45 degree corner fitting, an inside corner fitting, an outside corner fitting or an outside 45 degree corner fitting. Each fitting component would include a base with a plurality of sets of raised projections to accommodate the fitting divider wall and the intended desired channel split.

The design of the fitting divider wall of the present invention enables an installer to quickly install the fitting divider wall in the fitting base of the raceway system. Since the fitting divider wall is snap-fit into the base, the need for additional fasteners has been eliminated thereby reducing the manufacturing costs of the raceway system. Additionally, since the fitting divider wall is not permanently attached, the placement of the fitting divider wall may be adjusted, if desired.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A multi-channel raceway system comprising:
   a raceway having a base with a bottom and sidewalls defining a channel, the raceway base having a divider wall positioned within the raceway channel;
   a fitting component connected to the raceway base, the fitting component having a fitting base with a bottom and sidewalls defining a fitting channel, the fitting base having a plurality of sets of raised projections; and
   a fitting divider wall positioned within the fitting channel of the fitting component, the fitting divider wall includes at least one positioning tab along a bottom of the fitting divider wall,
   wherein the at least one positioning tab of the fitting divider wall is installed in one of the raised projections extending from the fitting base to secure the fitting divider wall to the fitting base.

2. The multi-channel raceway system of claim 1, wherein the raised projections include a slot for receiving the at least one positioning tab of the fitting divider wall.

3. The multi-channel raceway system of claim 1, wherein the at least one positioning tab includes an outwardly extending bead and relief slots and the raised projections include a relief area, whereby when the at least one positioning tab is installed in one of the raised projections the bead of the at least one positioning tab contacts one of the raised projections to deflect a portion of the at least one positioning tab into the relief area.

4. The multi-channel raceway system of claim 1, wherein the sets of raised projections are positioned on the fitting base to hold the fitting divider wall to divide the channel into a plurality of channel splits.

5. The multi-channel raceway system of claim 1, wherein the fitting divider wall includes interlocking tabs for engaging the raceway divider wall.

6. The multi-channel raceway system of claim 5, wherein the interlocking tabs include a plurality of fingers.

* * * * *

UNITED STATES PATENT AND TRADEMARK OFFICE
CERTIFICATE OF CORRECTION

| | |
|---|---|
| PATENT NO. | : 7,671,277 B2 |
| APPLICATION NO. | : 12/166643 |
| DATED | : March 2, 2010 |
| INVENTOR(S) | : Raymond M. Hill et al. |

It is certified that error appears in the above-identified patent and that said Letters Patent is hereby corrected as shown below:

Column 1, line 27 which reads "divider all is required to support raceway divider walls and to" should read "divider wall is required to support raceway divider walls and to".

Signed and Sealed this
Seventeenth Day of May, 2011

David J. Kappos
*Director of the United States Patent and Trademark Office*